No. 764,263. PATENTED JULY 5, 1904.
R. STONE.
MOTOR COACH.
APPLICATION FILED DEC. 1, 1902. RENEWED NOV. 30, 1903.
NO MODEL.
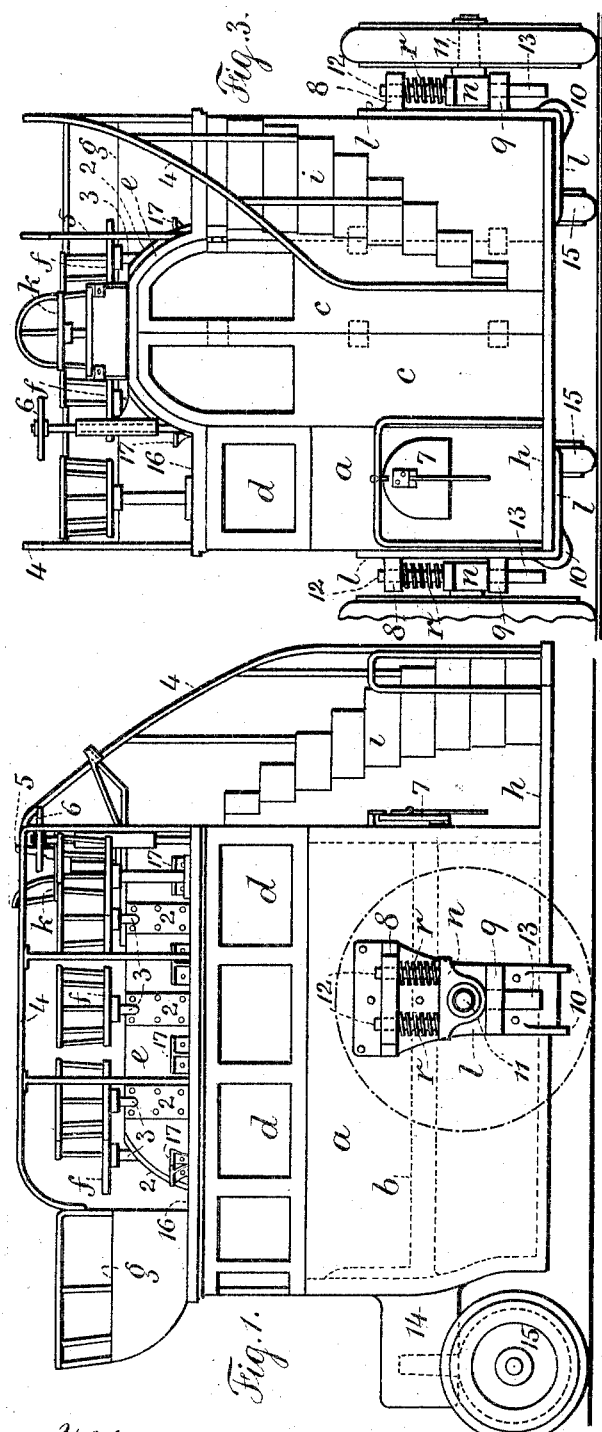
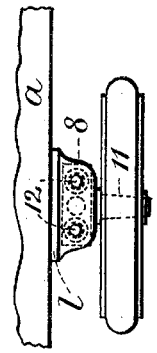
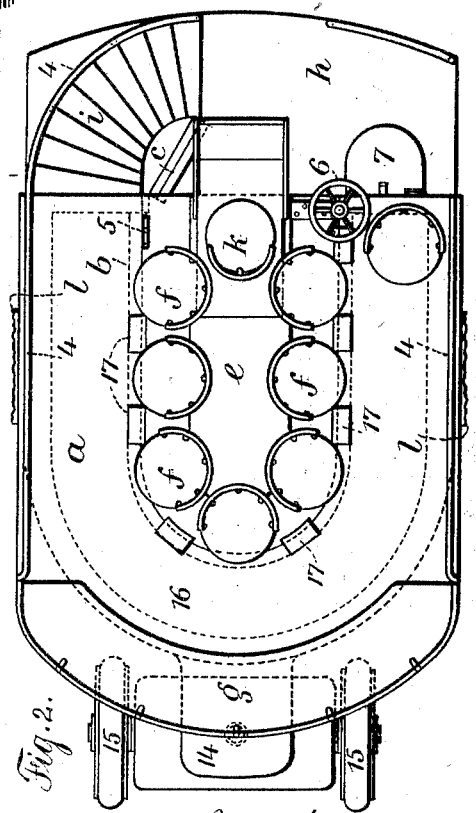
Witnesses:
J. Staib
Chas. H. Smith
Inventor:
Roy Stone
per L. W. Tirrell & Son
Attys.

No. 764,263. Patented July 5, 1904.

UNITED STATES PATENT OFFICE.

ROY STONE, OF NEW YORK, N. Y.

MOTOR-COACH.

SPECIFICATION forming part of Letters Patent No. 764,263, dated July 5, 1904.

Application filed December 1, 1902. Renewed November 30, 1903. Serial No. 183,289. (No model.)

*To all whom it may concern:*

Be it known that I, ROY STONE, a citizen of the United States, residing in the borough of Manhattan, city, county, and State of New York, have invented an Improvement in Motor-Coaches, of which the following is a specification.

My invention relates to motor-coaches, and particularly to the form and construction of the coach-body and to the manner of and means for securing the forward wheels thereof to the same, and essentially is an improvement upon the structure set forth in my application, Serial No. 115,950, filed July 17, 1902.

In carrying out my invention the body of the coach is comparatively short and practically U-shaped in plan, with an interior seat conforming in shape with the coach-body. The body is square across the front, the rounding portion being at the rear, and there is a door in the front portion which is the only entrance to the interior of the coach, and a platform level with the coach-body floor extends forward in front of the door. I provide a stairway leading from the front platform to the roof of the coach and suitable hand-rails for the stairway and guide-rail extending around the edge of the roof. In the coach-roof there is a central longitudinal arch of such dimensions as to leave a walk around the top of the coach between the exterior of said arch and the guide-rails, and on the sides of said arch I provide a number of seats, which may be either stationary or revolving. There is also a roof rear seat, preferably concentric with the curved portion of the interior seat and slightly overhanging the coach-body, so that the walk may be the same width at the rear as on the sides.

I employ support-straps, axle-blocks, and springs for securing the coach-body to the main supporting-wheels in such a manner that the floor and platform are extremely near the surface of the road, certainly not higher than the ordinary curb or sidewalk level. The wheels, shown as secured to a truck at the rear of the coach and connected to a projection therefrom, may be driving or steering wheels, or both. These parts, however, may be of any suitable construction and form no essential part of my present invention.

My improved coach-body is particularly adapted for use in crowded thoroughfares. Being short, it is readily run between trucks and street-cars. Being a "double-decker," its capacity is not materially lessened by its shortened length. The floor and platform being about the height of the curb above the street, the coach is easily entered from the sidewalk, and, moreover, the usual disadvantage in height over all in double-deckers is also overcome by the coach-body being hung so low.

In the drawings, Figure 1 is a side elevation showing the main support-wheels removed, and Fig. 2 is a plan of the same. Fig. 3 is a front elevation. Fig. 4 is a plan of the means for connecting the main support-wheels to the coach-body.

$a$ represents the coach-body, which is preferably U-shaped in plan, is provided with an interior seat $b$, which conforms in outline with the shape of the coach-body, and is upholstered in any convenient manner. The coach-body $a$ is entirely inclosed, having a door $c$ in the front, which is the only means of entrance and exit, there being suitable windows $d$ extending along the sides of the coach. A platform $h$ extends forward from the coach-body and is on the same level as the floor thereof. From this platform a stairs $i$ leads to the roof, there being suitable hand and guide rails 4 following up the outside of the stairs and extending around the edge of the roof of the coach-body. A driver's seat $k$ is placed directly over the door $c$, and the usual controlling-lever 5 and steering-wheel 6 are situated conveniently near the said driver's seat. I may also provide an additional seat 7, secured to the front of the coach near the door and opposite the stairs, and this seat may be arranged to fold up against the coach-body when not in use, as shown in Figs. 1 and 3. The platform is provided with a hand and guide rail, which by its location provides both side and front spaces for simultaneous entrance to and exit from the coach by said platform.

Centrally and longitudinally the coach-body roof is arched, as at $e$, leaving a walk 16 between the same and the guide-rails. On the exterior of the arched portion and at spaced-apart intervals I employ supports 2, carrying standards 3, to which chair-seats $f$ are secured. These chair-seats may be of the revolving or stationary type. The rear of the coach-roof is also provided with a seat $g$, slightly overhanging the coach-body and preferably concentric with the curved portion of the interior seat.

One of the main objects of my present invention is to support the coach-body so that the floor and platform will be extremely near the ground. In order to accomplish this, I employ on both sides of the coach-body and slightly forward of the center, support-straps $l$, preferably of metal and of L shape, the upper part of the said straps being somewhat wider than the lower part. These support-straps are secured to the sides of the coach in any convenient manner, the wider part being provided with a transverse shoulder 8 and the narrower part with a similar shoulder 9, and the corners of the support-straps may be strengthened by flanges 10. I also employ axle-blocks $n$, integral with which are the axles 11 and guide-pins 12 and 13, the pins 12 being adapted to extend upward through guideways in the shoulders 8 and the pin 13 to extend downward through a guideway in the shoulder 9, the pins 12 being surrounded with suitable springs $r$, extending between the shoulders 8 and top of the axle-frame $n$ and bearing the major part of the weight of the coach. By this construction the floor of the coach may be made about as much above the street-level as the ordinary curb, which is the desired height.

At the rear of the coach there is shown a projection or bracket-arm 14, to which is pivotally secured a truck and the wheels 15. I prefer to steer the coach by this truck and these wheels 15. The motors for driving the coach are to be conveniently attached either to the said truck or to the coach-body; but the devices or the manner of steering or driving, which form no essential part of my present invention, may be of any desired character.

I may also employ foot-rests 17 between the seats secured on the curved portion of the roof for the convenience of passengers who desire to face forward. The use of these rests tends to keep the walk clear, and they may be employed to advantage when the roof is covered as steps for crossing over the arched parts of the roof between the seats from one side of the roof passage-way to the other.

I claim as my invention—

1. In a motor-coach, the combination with a coach-body of substantially U shape in plan, of an interior seat conforming with the shape of the coach-body, a front platform substantially level with the coach-body floor, a roof having a central longitudinal arch therein, seats arranged on the roof around the sides of said arch, means of access to the said roof from the said platform, and means for supporting the coach-body so that the floor and platform thereof are virtually on a level with the ordinary curb.

2. In a motor-coach, the combination with a coach-body of substantially U shape in plan, of an interior seat conforming with the shape of the coach-body, a front platform substantially level with the coach-body floor, a roof having a central longitudinal arch therein, seats arranged on the roof around the sides of said arch, a seat on the roof at the rear and concentric with the curved portion of the interior seat, a stairway from the platform to the roof, guide-rails for the stairs and roof, a driver's seat directly over the entrance, and means for supporting said coach-body so that the floor and platform thereof are virtually level with the ordinary curb.

3. In a motor-coach, the combination with a coach-body of substantially U shape in plan, of an interior seat conforming in shape with the coach-body, a front platform level with the coach-body floor, support-straps secured to both sides of the coach-body and having perforated shoulders integral therewith, axle-blocks, guide-pins integral with said blocks and adapted to pass through and be vertically movable in said shoulders, springs surrounding the upper guide-pins and extending between the upper shoulder and the face of the axle-block and steering-wheels at the rear of the coach, the whole running-gear being so arranged that the coach-body floor and platform are virtually on the level of an ordinary curb.

4. In a motor-coach, the combination with a coach-body of substantially U shape in plan and having a door in front, of an interior seat conforming with the shape of the coach-body, a front platform level with the coach-body floor, a roof having a central longitudinal arch therein, seats arranged on the roof around the sides of said arch, a seat on the roof at the rear and concentric with the curved portion of the interior seat, a stairway from the platform to the roof, guide-rails for the stairs and roof, a driver's seat directly over said door, support-straps secured to both sides of the coach-body and having perforated shoulders integral therewith, axle-blocks, guide-pins integral with said blocks and adapted to pass through and be vertically movable in said shoulders, springs surrounding the upper guide-pins and extending between the upper shoulder and the face of the axle-block, and driving and steering mechanism at the rear of the coach, the whole running-gear being so arranged that the coach-body floor and platform are virtually on the level of an ordinary curb.

Signed by me this 25th day of November, 1902.

ROY STONE.

Witnesses:
 GEO. T. PINCKNEY,
 S. T. HAVILAND.